US00RE35091E

United States Patent [19]

Bergloff et al.

[11] E Patent Number: Re. 35,091

[45] Reissued Date of Patent: Nov. 21, 1995

[54] PRESSURE DEVICE AND SEAL FOR FILTER BELT MACHINES

[75] Inventors: Dag Bergloff, Graz; Peter Scheucher, Kumberg; Rudolf Schieg; Giselher Stummer, both of Graz, all of Austria

[73] Assignee: Mascheninfabrik Andritz Actiengesellschaft, Graz, Austria

[21] Appl. No.: 110,840

[22] Filed: Aug. 24, 1993

Related U.S. Patent Documents

Reissue of:

[64] Patent No.: 4,834,884
Issued: May 30, 1989
Appl. No.: 084,007
Filed: Aug. 10, 1987

U.S. Applications:

[63] Continuation of Ser. No. 706,840, May 29, 1991, abandoned.

[30] Foreign Application Priority Data

Aug. 18, 1986 [AT] Austria ..... A2214/86

[51] Int. Cl.[6] ..... B01D 33/04; B30B 5/04; B30B 5/06

[52] U.S. Cl. ..... 210/401; 100/151; 100/154; 162/272; 162/358.1; 210/231; 210/386; 210/783; 277/34; 277/226; 277/DIG. 7

[58] Field of Search ..... 210/231, 386, 210/401, 783; 100/118, 151–154, 211; 162/272, 305, 358.1; 277/34, 34.3, 34.6, 226, DIG. 7

[56] References Cited

U.S. PATENT DOCUMENTS

| | | |
|---|---|---|
| 3,788,651 | 1/1974 | Brown et al. . |
| 3,821,928 | 7/1974 | Sugita . |
| 3,839,147 | 10/1974 | Daane . |
| 3,970,515 | 7/1976 | Busker . |
| 4,153,550 | 5/1979 | Lautrette . |
| 4,187,776 | 2/1980 | Schroder . |
| 4,420,359 | 12/1983 | Goldsworthy . |
| 4,427,157 | 1/1984 | Klein . |
| 4,481,118 | 11/1984 | Heissenberger et al. . |
| 4,492,611 | 1/1985 | Heinander . |
| 4,537,408 | 8/1985 | Pankoke . |
| 4,555,988 | 12/1985 | Pankoke . |
| 4,600,203 | 7/1986 | Miller et al. . |
| 4,632,722 | 12/1986 | Pankoke . |
| 4,693,177 | 9/1987 | Pankoke . |
| 4,723,484 | 2/1988 | Held . |
| 4,851,119 | 7/1989 | Bergloff et al. . |

FOREIGN PATENT DOCUMENTS

| | | |
|---|---|---|
| 163820 | 3/1985 | European Pat. Off. . |
| 166886 | 4/1985 | European Pat. Off. . |
| 2803523 | 8/1979 | Germany . |
| 2907086 | 8/1980 | Germany . |
| 2937410 | 4/1981 | Germany . |
| 3013231 | 10/1981 | Germany . |
| 3046432 | 8/1982 | Germany . |
| 3126969 | 1/1983 | Germany . |
| 3129206 | 2/1983 | Germany . |

*Primary Examiner*—Karen M. Hastings
*Attorney, Agent, or Firm*—Roylance, Abrams, Berdo & Goodman

[57] ABSTRACT

A pressure device for machines for dewatering or filtering of suspensions, sludges or the like or for material to be pressed for the exertion of surface pressure on at least one circulating pressure belt which can be provided for supporting an equally circulating filter belt, which pressure device consists of an essentially completely hollow pressure bladder in the form of a closed frame in particular of essentially quadrangular shape viewed in top view of the pressure belt, which pressure bladder is subjectable to pressure medium and forms a very small, self-adjusting gap on the edge.

42 Claims, 3 Drawing Sheets

PRESSURE DEVICE AND SEAL FOR FILTER BELT MACHINES

Matter enclosed in heavy brackets [ ] appears in the original patent but forms no part of this reissue specification; matter printed in italics indicates the additions made by reissue.

*This is a continuation of reissue application Ser. No. 07/706,840 filed May 29, 1991 now abandoned.*

The invention relates to a pressure device for machines and to machines provided therewith for dewatering or filtering of suspensions, sludges, in particular fibrous material or pulp suspensions or the like, or for material to be pressed, for exerting pressure on at least one circulating pressure belt which can be provided for supporting at least one also circulating filter belt, preferably screen belt.

For the further processing or the disposal of various sludges or fibrous suspensions accumulating in industry or community facilities, prior dewatering is necessary. It is important in this to obtain high dry matter contents, either for further use or the disposal of this material or for the subsequent drying of the product. In the latter case, the energy required for mechanical pressing is essentially lower than that required for thermal drying, so that one aim of dewatering is to obtain the highest possible contents of dry matter by mechanical means.

For dewatering according to the principle of the double screen belt press, two values, above all, are determining for the dewatering result, namely, the dewatering time and the dewatering pressure, both having to be adapted to the material to be dewatered, and moreover, the highest possible values for pressing time as well as pressing pressure are aimed at.

In conventional belt presses, the pressing power is applied to the two filter belts either via looped rollers as a result of screen tension or socalled press nips, with a linear support of the press belts by means of press rollers. There are also supports of the filter belts in the form of perforated plates, although sliding friction occurs between these plates and the moving screen belts, so that the pressing forces are limited, on the one hand, and high frictional forces with corresponding stress and abrasion of the screen belts and high driving power requirement result, on the other hand.

Similar problems also result when circulating pressure belts are interposed between the screen belts and stationary pressure plates or the like, in this case, however, between the pressure belts and the pressure plates or the like.

It is the object of the invention to avoid these disadvantages and to provide a pressure device or a machine provided therewith which permits the exertion of a continuous pressing power over the entire or a larger surface of the press cake at low energy requirement.

This object is achieved according to the invention in a pressure device of the type initially mentioned if at least one, very largely, conveniently completely, separate, essentially closed, deformable and essentially completely hollow pressure bladder of flexibly elastic material having tensile strength in the form of a closed frame conveniently adapted to the surface facing it or the surface abutting it of the supporting or pressing device and thus abutting this surface, in particular of quadrangular, for instance rectangular shape viewed in top view onto the filter belt or pressure belt, conveniently with rounded corners, is arranged, a gap, advantageously a small gap in relation to the height of the pressure bladder, being independently adjustable between pressure bladder and pressure belt, at least by admitting pressure medium into the pressure space formed by the frame-shaped pressure bladder and the inner space of the pressure bladder. The hollow pressure bladder has an essentially closed cross section.

By the arrangement according to the invention, it is achieved that even at fluctuating thickness of the material to be pressed, an automatic adjustment takes place and the pressing power thus remains unchanged.

According to an embodiment of the invention, it is provided that the hollow pressure bladder is at least partially a component of a wall of an essentially completely enclosed pressure space to which pressure medium, in particular pressure fluid (liquid) can be admitted and which is arranged on one side of the pressure belt, the hollow pressure bladder being arranged at a distance from the wall at least on exertion of pressure by the admission of pressure medium, thus forming a gap through which pressure medium can escape for lubricating. In this embodiment, fluid friction without contact of solid parts is obtained between the moving belts and the stationary parts, so that friction forces and thus wear and driving power are kept very low. The gap formed between the hollow pressure bladder and the pressure belt, which gap is very small in relation to the thickness of the pressure belt, adjusts itself independently on being subjected to pressure by the pressure medium. In the inactive position, i.e. when the machine is not in operation, this gap optionally need not be present.

The hollow pressure bladder can consist of flexibly elastic material having tensile strength, in particular of fabric-reinforced plastic material or rubber. The hollow pressure bladder can also be formed double-walled, for instance of an inner skin of compression-proof elastic material and an outer skin of material having tensile strength.

It is convenient if the pressure space adjacent the pressure belt is jointly defined on all sides by the pressure belt and the hollow pressure bladder which is shaped frame-like for this purpose, with the marginal zones of the pressure space being particularly closed against the hollow pressure bladder. The hollow pressure bladder is preferably formed auto-adjustingly in its marginal zones.

It is convenient to form the hollow pressure bladder viewed in plan view onto the *first* filter belt or *first* pressure belt essentially quadrangular, preferably rectangular or square, with the corners preferably being rounded off.

It is further convenient to fasten the *first* hollow pressure bladder by means of at least one frame on a *first* stationary support *having first and second sides*, this frame also preferably being formed essentially quadrangular, for instance rectangular or square. The frame can be at least partially hollow. For fastening the hollow pressure bladder on the *second side of the* support of the machine, it is convenient to clamp the hollow pressure bladder between two *rectangular* frames. For maintaining a constant pressure or for compensating pressure, it is convenient if the pressure space adjacent the pressure belt and the pressure space in the interior of the hollow pressure bladder are connected to one another by means of at least one opening.

In order to be able to adjust different pressures in the pressure space and in the interior of the hollow pressure bladder, it is convenient to close the pressure space adjacent the pressure belt and the pressure space in the interior of the hollow pressure bladder against each other and make them suitable for the admission of pressure medium, optionally of different pressures, through separate inlets or bores.

In order to prevent friction between the hollow pressure bladder and the pressure belt in the event of breakdown, for instance at failure of supply with pressure medium, it is convenient to provide the hollow pressure bladder in the gap between it and the pressure belt with at least one wear-protection sleeve abutting the pressure belt and made of abrasion proof, well gliding material, in particular plastic material, for instance polytetrafluorethylene or polyurethane.

In order to prevent loss of pressure medium, it is convenient to provide at least one seal of rubber or plastic material gliding along the pressure belt outside of the hollow pressure bladder preferably in circulating direction of the pressure belt and transversely thereto spacially behind or laterally of the hollow pressure bladder, i.e. spacially behind or laterally of the gap formed between the hollow pressure bladder and the pressure belt at least on admission of pressure medium or in operation, with at least one opening for the discharge of pressure medium escaping through the gap being provided between the hollow pressure bladder and the seal. The gliding seal advantageously completely encloses the outside of the pressure bladder.

It is also possible to provide two or more hollow pressure bladders spacially or tightly adjacent in circulating direction of the pressure belt, in which case it is convenient for the gliding seal to enclose the entire group of pressure bladders.

The invention is explained in the following by means of exemplary embodiments under reference to the accompanying drawings.

Figure 1:
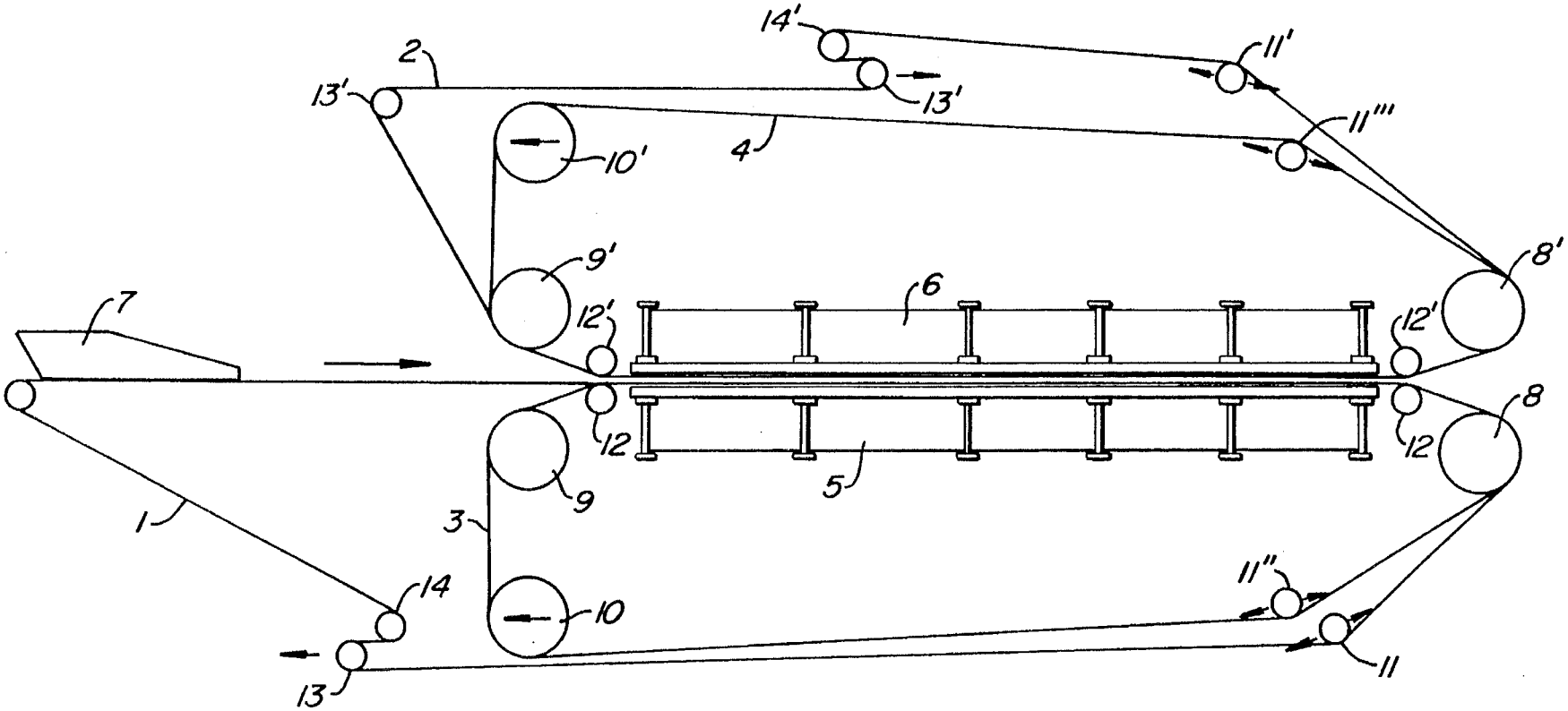
FIG. 1 shows a diagrammatic view of a dewatering machine with the pressure device according to the invention.

The dewatering machine of compact construction shown diagrammatically in FIG. 1 comprises a lower endless filter belt 1 and an upper endless filter belt 2 between which the material to be dewatered is made to press. The lower filter belt 1 is formed as a supporting screen and is passed over a plurality of rollers, i.e. a screen regulating roller 11, a reversing roller 14 and a tensioning roller 13. The upper filter belt 2 is formed as a cover screen and is passed over guide rollers 14', a tensioning roller 13' as well as over a regulating roller 11'.

The material to be dewatered is charged by a charging means 7 onto the lower filter belt 1 so that a cake of approximately uniform thickness is formed to be dewatered between the two filter belts 1,2.

In the pressing zone, the two *first and second* filter belts 1, 2 are supported by circulating *first and second* , endless pressure bells 3 and 4. The lower pressure belt 3 as well as the upper pressure belt 4 are passed over reversing rollers 9, 9', tensioning rollers 10, 10' and regulating rollers 11", 11'". The drive can be effected, for instance, by means of rollers 8, 8'. At the beginning and at the end of the press line, smaller reversing rollers 12, 12' are arranged. The pressure belts 3, 4 are made of elastic material which is impermeable to water and liquids, such as rubber or plastic material. The *first and second stationary* supports 5, 6 *having first and second sides* serve for exerting the required pressing power on the pressure belts 3,4 and further on the filter belts 1,2 and thus on the press cake lodged therebetween. These supports 5,6 take up the entire pressing force and are therefore of very stable construction. On either side of the dewatering machine, the upper and lower supports are connected to one another in order to achieve a transmission of the entire forces by a short way. This has the advantage that the very high pressing forces do not have to be transmitted to the machine frame, so that this machine frame can be of comparatively lightweight and inexpensive construction. A special hydrostatic pressure device shown in detail in FIG. 2 serves for the transmission of the forces from the supports 5,6 to the moving pressure belts 3,4.

Figure 2:
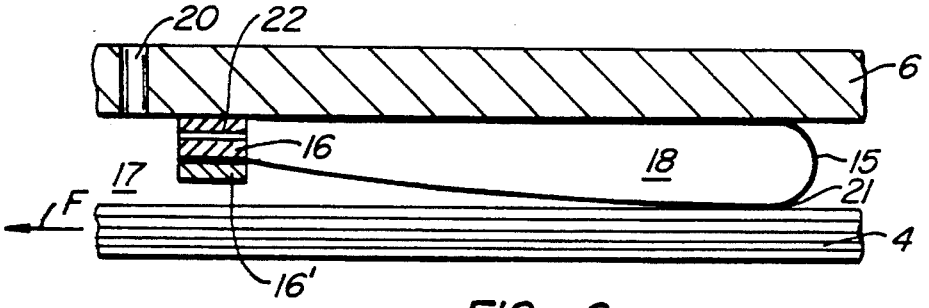
FIG. 2 shows a sectional view through the pressure bladder along line II—II in FIG. 3.
Figure 3:
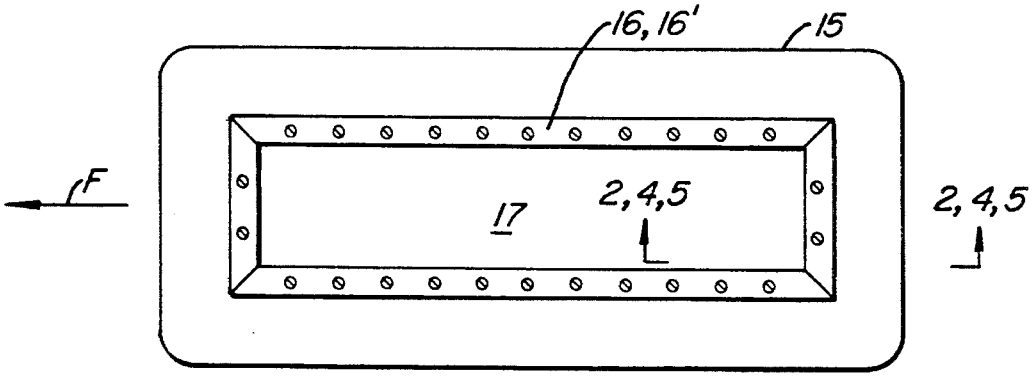
FIG. 3 shows the shape and fastening of the pressure bladder according to FIG. 2, 4 and 5 schematically in plan view in reduced scale.

FIG. 2 diagrammatically shows the pressure device in section along line II—II in FIG. 3. For this purpose, a pressure bladder 15 is bent in U-shape and made of elastic material having tensile strength *having first and second edges*, such as a web of fabric-reinforced plastic material or rubber, and provided on the *second side of the* stationary support 6; this pressure bladder 15 is attached by means of [an] *a first* intermediary frame 16 *clamping a first edge of the bladder to the support 6* and a *second* clamping frame 16' *clamping a second edge of the bladder to the frame 16* in such a way that an interior space 18 sealed all around and kept at a certain superpressure is formed.

The surface pressure is exerted on the moving pressure belt 4 in such a manner that a pressure medium, such as, for instance, water, is pumped through an inlet 20 *from a pressure source on the first side of the first support 6* into a pressure space 17 adjacent the pressure belt 4. A small portion of the amount of water introduced escapes through the very small, circumferentially extending gap 21. This amount, however, is constantly replaced through the inlet 20 by means of a pump not shown in detail so that a constant pressure of the desired value is maintained in the pressure space 17.

A connection between the pressure space 17 adjacent the pressure belt 4 and the interior space 18 of the pressure bladder 15 is established by a bore 22. By this bore 22, the pressure in the interior space 18 of the pressure bladder 15 and in the pressure space 17 is kept equal, so that the elastic pressure bladder 15 is kept in equilibrium. The result of this special arrangement is that the width of the gap 21 automatically adjusts itself to a very small value in the order of magnitude of a few hundredths of millimeters. This keeps the volume of escaping pressure medium, for instance water, very low, which also requires very little energy for supplementing the pressure medium, for instance water, by means of the pump.

The distance between the support 6 and the moving pressure belt 4 is not constant, but changes according to the thickness of the press cake to be dewatered and also due to the compression of the material under the influence of the pressing force. The embodiment described has the advantage that the pressure bladder 15 automatically adapts itself to such fluctuations of thickness, so that in this case, the gap 21 also remains very small and that the pressure in the pressure space 17 is maintained. This makes it possible to maintain a constant surface pressure over the entire pressing surface although the material to be pressed is not level and shows differences in thickness.

Figure 4:
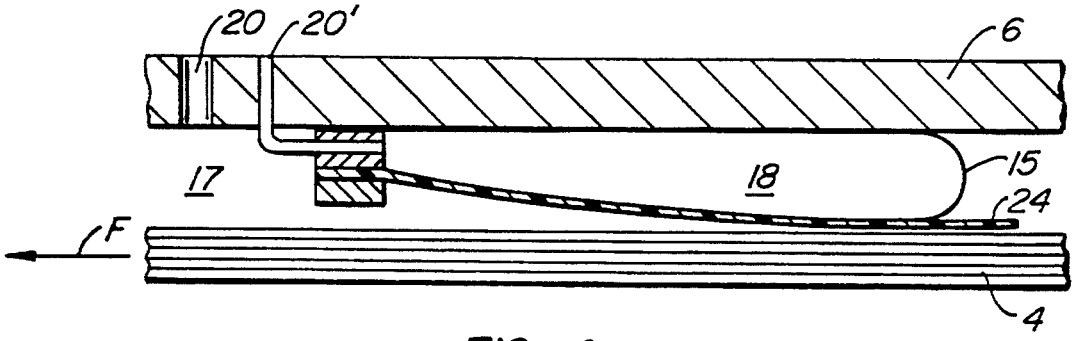
FIG. 4 shows a sectional view of the pressure bladder along line IV—IV in FIG. 3 of a special arrangement for pressure feed as well as the placing of a wear-protection sleeve.
Figure 5:
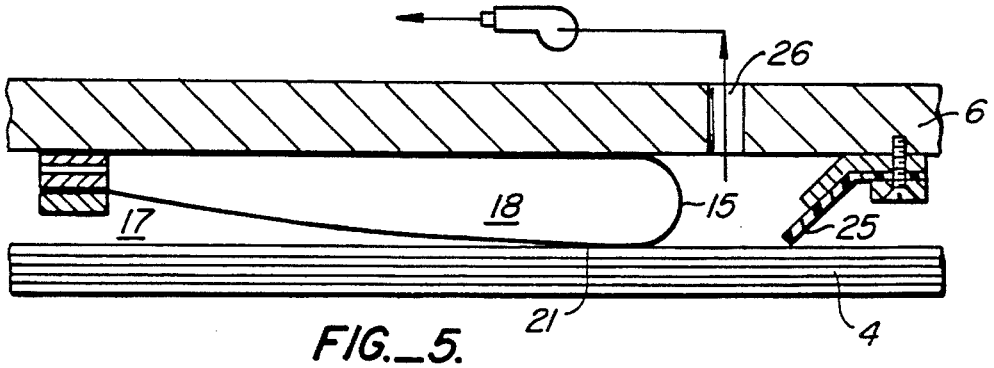
FIG. 5 shows a sectional view along line V—V in FIG. 3 through a pressure bladder with a gliding seal arranged behind it; this seal encloses the pressure bladder on all sides; if several pressure bladders are provided, this seal encloses all pressure bladders or the group of pressure bladders completely on the outside.

FIG. 3 diagrammatically shows the configuration of the pressure bladders 15 according to FIGS. 2, 4 and 5 in reduced scale as compared to FIGS. 2, 4 and 5, in plan view, the seal according to FIG. 5 not being shown. The exemplary shape shown here is a rectangular one, with the clamping frame 16' fastened, for instance, by means of suitable, spaced screws. The pressure bladder 15 is formed, for reasons of production, not with sharp, but with slightly rounded corners.

FIG. 4 shows in sectional view along line IV—IV in FIG. 3 a special arrangement of a pressure device. In addition to the inlet 20 for the pressure space 17, there is a separate inlet 20' *in clamping frame 16* for the interior space 18 of the pressure bladder 15 *including a conduit extending from the clamping ring 16 to the pressure medium source.* This makes it possible to obtain slightly different pressures in the pressure space 17 and in the interior space of the pressure bladder 15, so that a special adaptation of the pressure bladder 15 is possible, which is of advantage in some cases of use.

FIG. 4 also shows the arrangement of a wear-protection sleeve 24 of abrasion-proof, well gliding material, in particular plastic material, for instance polytetrafluor ethylene or polyurethane. This serves for preventing wear of the pressure bladder 15 at failure of the supply of compressed water or other breakdowns where it comes into contact with the circulating pressure belt 4. This also offers the advantage that the materials for the impermeable pressure belt 4 and the wear-protection sleeve 24 can be optimally matched to one another in respect of gliding behavior and no consideration need be given to abrasion in the selection of the material of the pressure bladder 15. An additional advantage resides in the fact that in case of damage, for instance by faulty operation, only the comparatively inexpensive wear-protection sleeve 24 need be exchanged, while the pressure bladder 15 remains undamaged.

FIG. 5 shows as a further variant a sectional view along line V—V in FIG. 3 through the pressure bladder 15 with the pressure space 17 and the interior space 18 of the pressure bladder 15. This shows a further seal 25 also fixed to the *second side of the* support 6. This seal 25 glides on the moving pressure belt 4 and serves for trapping the pressure medium escaping from the gap 21, so that this medium can be discharged via bores 26 and returned to the pressure space 17 via a pump in the cycle which is not shown. This prevents a loss of pressure medium or pressure water which results in substantial advantages in respect of operation and cost.

The seal 25 consists of rubber or plastic material, for instance thermoplastic material, and is arranged in circulating direction and in transverse direction of the pressure belts 3,4 spacially behind these, i.e. spacially after the gap 21 between the hollow pressure belts 3,4 as well as spacially laterally next to the pressure bladder 15.

Figure 6:
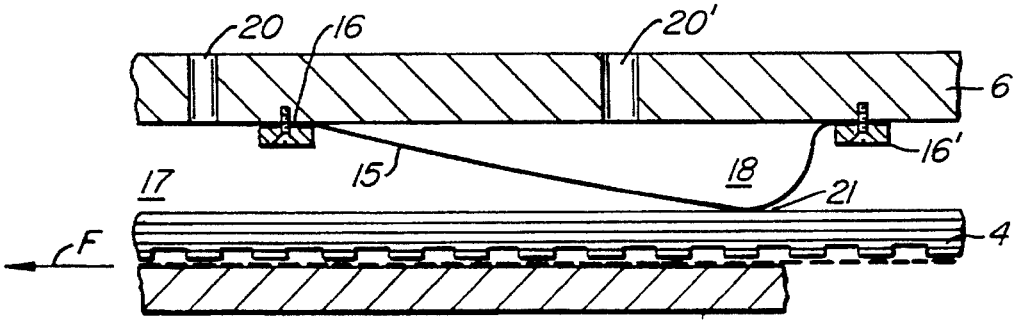
FIG. 6 shows a further variant with a half-bladder.

FIG. 6 shows as a further example a different embodiment of the pressure device in sectional view. In this the interior space 18 is defined partly by the pressure bladder 15 and partly by the fixed support 6. The fastening of the pressure bladder 15 is effected by means of the clamping frames 16 and 16' which are formed essentially quadrangularly and results in a tight connection.

Figure 7:
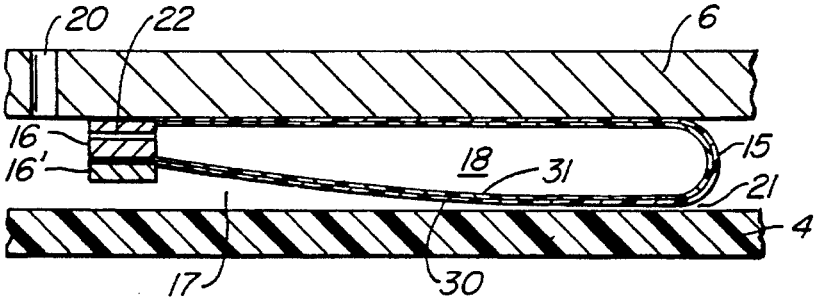
FIG. 7 shows an alternative embodiment in which the pressure bladder has a double wall.

FIG. 7 shows an alternative embodiment in which pressure bladder 15 has an outer wall 30 and an inner wall 31. Inner wall 31 is formed from an elastic material, and outer wall 30 is formed from a material having a higher tensile strength than the material used for inner wall 31. Pressure bladder 15 is attached to the device in the same manner as the pressure bladder of FIG. 2.

Figure 8:
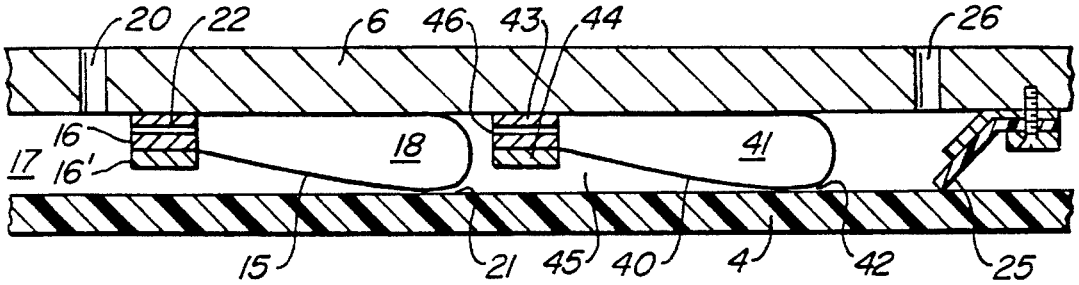
FIG. 8 shows an alternative embodiment having two pressure bladders.

FIG. 8 shows another alternative embodiment in which a second hollow pressure bladder 40 is disposed around the first hollow pressure bladder 15. Bladder 40 has the same frame-like shape as bladder 15 and completely encircles and encloses bladder 15. Bladder 40 is a attached to the device in the same manner as bladder 15, i.e., by a frame 43 and a clamping frame 44. Frame 43 has a bore 46 which communicates the interior space 41 of bladder 40 with the pressure space 45. Pressure space 45 is bounded by bladder 40, bladder 15, belt 4, and stationary support 6. If a seal 25 is used with this double bladder arrangement, seal 25 is disposed beyond bladder 40 so as to encircle and enclose both bladders.

In a machine with an upper pressure belt and a lower pressure belt, such as it is shown in FIG. 1, the hollow pressure bladder described can be associated with the upper and the lower pressure belts. The pressure belts are formed smooth on their sides facing the pressure bladder.

The pressure device or a machine provided therewith can also be used for material to be pressed, in which case only pressure belts, but no filter belts or screen belts are used. The pressure bladders or hollow frames filled with pressure medium can be subjected to the action of pressing or supposing means with plane or concavely curved plates or surfaces facing them, the pressure pads or hollow frames can also be arranged in hollow chambers open towards the pressure belt. The belts could also pass over one or a plurality of roller(s), which results in a convex support. In this case, the closed frames formed of the hollow pressure bladders would have to be convexly curved accordingly. The material to be pressed could also be dry material.

According to the invention, a pressure space proper is only present in the space enclosed by the hollow frame or pressure pad and in the interior of the frame or pad, after the zone surrounding the frame or pad, only leakage water or the like escapes through the lubricating gap 21.

We claim:

1. Apparatus for pressing and dewatering or filtering suspensions, sludges, fibrous material or pulp suspensions, comprising:

a stationary support;

a driven, endless pressure belt;

a driven, endless filter belt, said apparatus being structured to press the material on two sides by exerting pressure on said pressure belt and on said filter belt;

a first pressure medium source;

means defining a pressure space partially bounded by said pressure belt and said support;

a first deformable, essentially hollow pressure bladder of flexibly elastic material having an interior space, said bladder being supported by said stationary support and being situated completely outside of said stationary support and having the form of a closed frame viewed in top view onto the pressure belt, said bladder further bounding said pressure space;

a gap formed between said bladder and said pressure belt;

means for adjusting the size of said gap by subjecting said pressure space and the interior space of the pressure bladder to pressure produced by said pressure source; a seal comprising either rubber or plastic material, said seal being disposed outside of the first hollow pressure bladder and outside of the pressure space to encircle and enclose said first hollow pressure bladder and said pressure space; and means defining an opening in the stationary support for the discharge of pressure medium escaping through the gap, said opening being disposed between the first hollow pressure bladder and said seal.

2. The apparatus according to claim 1, wherein said pressure belt supports said endless filter belt.

3. The apparatus according to claim 1, wherein said support has a flat surface facing said hollow pressure bladder and said bladder is structured in shape to abut said surface.

4. The apparatus according to claim 3, wherein said hollow pressure bladder is of substantially rectangular shape viewed in top view onto the pressure belt.

5. The apparatus according to claim 1, wherein the cross-section of the hollow pressure bladder perpendicular to the pressure belt is substantially closed.

6. The apparatus according to claim 1, wherein the hollow pressure bladder comprises either fabric-reinforced plastic material or rubber.

7. The apparatus according to claim 1, wherein the hollow pressure bladder has an inner skin and an outer skin.

8. The apparatus according to claim 7, wherein said inner skin is formed from elastic material and said outer skin is formed form material having a higher tensile strength than said inner skin.

9. The apparatus according to claim 1, wherein the hollow pressure bladder is essentially quadrangular viewed in plan view onto the pressure belt and has rounded edges.

10. The apparatus according to claim 1, further comprising a substantially rectangular frame for fixing the hollow pressure bladder to said stationary support.

11. The apparatus according to claim 10, further comprising a second frame, the hollow pressure bladder having two edges and being clamped between said two frames by the edges of said bladder.

12. The apparatus according to claim 1, further comprising means defining an opening connecting said pressure space with said interior space of the hollow pressure bladder.

13. The apparatus according to claim 1, wherein said means for adjusting comprises means defining a first opening communicating said pressure source with said pressure space and means defining a second opening communicating said pressure source with said interior space of the hollow bladder, said pressure spaces and said interior space being closed against one another.

14. The apparatus according to claim 1, further comprising a wear-protection sleeve of abrasion proof and well-gliding material disposed adjacent the pressure belt and reaching into said gap.

15. The apparatus according to claim 1, further comprising a second hollow pressure bladder disposed so as to surround said first hollow pressure bladder, said seal completely surrounding both said pressure bladders.

16. The apparatus according to claim 1, wherein the cross-section of the hollow pressure bladder perpendicular to the pressure belt is open, said interior space being bounded by said bladder and said stationary support.

17. Apparatus for pressing and dewatering or filtering suspensions, sludges, fibrous material or pulp suspensions, comprising:

a stationary support;

a driven, endless pressure belt;

a driven, endless filter belt, said apparatus being structured to press the material on two sides by exerting pressure on said pressure belt and on said filter belt;

a first pressure medium source; means defining a pressure space partially bounded by said pressure belt and said support;

a first deformable, essentially hollow pressure bladder of flexibly elastic material having an interior space, said bladder being supported by said stationary support and being situated completely outside of said stationary support and having the form of a closed frame viewed in top view onto the pressure belt, said bladder further bounding said pressure space;

a gap formed between said bladder and said pressure belt;

means for adjusting the size of said gap by subjecting said pressure space and the interior space of the pressure bladder to pressure comprising means defining a first opening communicating said first pressure source with said pressure space and means defining a second opening communicating a second pressure source with said interior space of the hollow bladder, said pressure space and said interior space being closed against one another;

a seal comprising either rubber or plastic material, said seal being disposed outside of the first hollow pressure bladder and outside of the pressure space to encircle and enclose said pressure bladder and said pressure space and means defining an opening formed in the stationary support for the discharge of pressure medium escaping through the gap, said opening in the stationary support being disposed between the hollow pressure bladder and said seal.

*18. Apparatus for pressing and dewatering or filtering suspensions, sludges, fibrous material or pulp suspensions, comprising:*

*a first stationary support having first and second sides;*

*a first driven, endless, fluid impervious, pressure belt;*

*a first driven, endless filter belt, said apparatus being structured to press material on two sides by exerting pressure on said first pressure belt and on said first filter belt;*

*a pressure medium source on said first side of said first stationary support for applying a pressure medium directly on said first pressure belt;*

*a first deformable, essentially hollow impervious pressure bladder of flexibly elastic material having an interior space for receiving pressure medium from said pressure medium source, said bladder being coupled to said second side of said first stationary support and having a form of a closed, annular frame viewed in top view onto the first pressure belt;*

*a pressure space bounded by said first pressure belt, said first bladder and said first support for receiving said pressure medium therein;*

*a gap formed between said first bladder and said first pressure belt;*

*means for adjusting the size of said gap by subjecting said pressure space to a first pressure and the interior space of the first pressure bladder to a second pressure produced by said pressure medium source;*

*first and second substantially rectangular frames for fixing the first hollow pressure bladder to said first stationary support, said first bladder having first and second edges, said first edge being clamped by said first frame and said second edge being clamped be said second frame; and*

*seal means coupled to said second side of said first stationary support and being disposed outside of and encircling said first pressure bladder and contacting said first pressure belt outside said pressure space.*

*19. The apparatus according to claim 18, wherein said first pressure belt supports said first endless filter belt.*

*20. The apparatus according to claim 18, wherein said*

*first support has a flat surface facing said first hollow pressure bladder and said first bladder is structured in shape to abut said surface.*

*21. The apparatus according to claim 20, wherein said first hollow pressure bladder is of substantially rectangular shape viewed in top view onto the first pressure bladder.*

*22. The apparatus according to claim 18, wherein the cross-section of the first hollow pressure bladder perpendicular to the first pressure belt is closed.*

*23. The apparatus according to claim 18, wherein the first hollow pressure bladder comprises either fabric-reinforced plastic material or rubber.*

*24. The apparatus according to claim 18, wherein the first hollow pressure bladder has an inner skin and an outer skin.*

*25. The apparatus according to claim 24, wherein said inner skin is formed from elastic material and said outer skin is formed from material having a higher tensile strength than said inner skin.*

*26. The apparatus according to claim 18, wherein the first hollow pressure bladder is essentially quadrangular viewed in plan view onto the first pressure belt and has rounded edges.*

*27. The apparatus according to claim 18, further comprising means defining an opening connecting said pressure space with said interior space of the first hollow pressure bladder.*

*28. The apparatus according to claim 18, wherein said means for adjusting comprises means for defining a first opening communicating said pressure medium source with said pressure space, and means for defining a second opening in said first clamping frame communicating said pressure medium source with said interior space of the first hollow bladder, said pressure space and said interior space being closed against one another.*

*29. The apparatus according to claim 18, further comprising a wear-protection sleeve of abrasion proof and well-gliding material disposed adjacent the first pressure belt and reaching into said gap.*

*30. The apparatus according to claim 18, wherein the cross-section of the first hollow pressure bladder perpendicular to the pressure belt is open, said interior space being bounded by said first bladder and said first stationary support.*

*31. The apparatus according to claim 18, further comprising a second, driven, endless filter belt being positioned adjacent said first filter belt for receiving said material therebetween.*

*32. The apparatus according to claim 31, further comprising a second, driven, endless, fluid impervious pressure belt for supporting said second filter belt.*

*33. The apparatus according to claim 18, wherein said means for adjusting the size of the gap includes means to maintain said first pressure at a different pressure than said second pressure.*

*34. Apparatus for pressing and dewatering or filtering suspensions, sludges, fibrous material or pulp suspensions, comprising:*

*a first stationary support having first and second sides;*

*a first driven, endless, fluid impervious, pressure belt;*

*a first driven, endless filter belt, said apparatus being structured to press material on two sides by exerting pressure on said first pressure belt and on said first filter belt;*

*a pressure medium source on said first side of said first stationary support for applying a pressure medium directly on said first pressure belt;*

*a first deformable, essentially hollow impervious pressure bladder of flexibly elastic material having an interior space for receiving pressure medium from said pressure medium source, said first bladder being coupled to said second side of said first stationary support and having a form of a closed, annular frame viewed in top view onto the first pressure belt;*

*a pressure space bounded by said first pressure belt, said first bladder and said first support for receiving said pressure medium therein;*

*a gap formed between said first bladder and said first pressure belt;*

*means for adjusting the size of said gap by subjecting said pressure space to a first pressure and the interior space of the first pressure bladder to a second pressure produced by said pressure medium source;*

*a second hollow pressure bladder disposed so as to surround said first hollow pressure bladder; and*

*seal means coupled to said second side of said first stationary support and being disposed outside of and encircling said second pressure bladder and contacting said first pressure belt outside said pressure space.*

*35. Apparatus for pressing and dewatering or filtering suspensions, sludges, fibrous material or pulp suspensions, comprising:*

*a first stationary support having first and second sides;*

*a first driven, endless, fluid impervious, pressure belt;*

*a first driven, endless filter belt, said apparatus being structured to press material on two sides by exerting pressure on said first pressure belt and on said first filter belt;*

*a pressure medium source on said first side of said first stationary support for applying a pressure medium directly on said first pressure belt;*

*a first deformable, essentially hollow impervious pressure bladder of flexibly elastic material having an interior space for receiving pressure medium from said pressure medium source, said first bladder being coupled to said second side of said first stationary support and having a form of a closed, annular frame viewed in top view onto the first pressure belt;*

*a pressure space bounded by said first pressure belt, said first bladder and said first support for receiving said pressure medium therein;*

*a gap formed between said first bladder and said first pressure belt;*

*means for adjusting the size of said gap by subjecting said pressure space to a first pressure and the interior space of the first pressure bladder to a second pressure produced by said pressure medium source; and*

*seal means coupled to said second side of said first stationary support and being disposed outside of and encircling said first pressure bladder and contacting said first pressure belt outside said pressure space; and*

*means for removing pressure medium passing through said gap and returning said pressure medium to said pressure space.*

*36. The apparatus according to claim 35, wherein said means for removing pressure medium is means for defining an opening in said first stationary support between said first bladder and said seal means.*

*37. Apparatus for pressing and dewatering or filtering suspensions, sludges, fibrous material or pulp suspensions, comprising:*

*a first stationary support having first and second sides;*

*a first driven, endless, fluid impervious pressure belt;*

*a first driven, endless filter belt, said apparatus being structured to press material on two sides by exerting pressure on said first pressure belt and on said first filter belt;*

*a pressure medium source on said first side of said first stationary support for applying a pressure medium directly on said first pressure belt;*

*a first deformable, essentially hollow impervious pressure bladder of flexibly elastic material having a first end and a second end and defining an interior space;*

*clamping means for coupling said first bladder to said second side of said first stationary support, said first bladder having a form of a closed, annular frame viewed in top view onto the first pressure belt, said clamping means having an inlet communicating said interior space of said first pressure bladder to said pressure medium source;*

*a pressure space bounded by said first pressure belt, said first bladder and said first support for receiving said pressure medium therein;*

*a gap formed between said first bladder and said first pressure belt;*

*means for adjusting the size of said gap by subjecting said pressure space to a first pressure and the interior space of the first pressure bladder to a second pressure produced by said pressure medium source.*

*38. The apparatus according to claim 37, said clamping means comprising a first clamping ring coupled to said first stationary support and securely clamping said first end of said first bladder between said first clamping ring and said first stationary support, and a second clamping ring coupled to said first clamping ring and securely clamping said second end of said first bladder therebetween.*

*39. The apparatus according to claim 38, said inlet comprises means defining a bore in said first clamping ring extending from said pressure space to said interior space of said first bladder.*

*40. The apparatus according to claim 38, said inlet comprises a conduit coupled to said first clamping ring extending from said pressure medium source directly to said interior space of said first bladder.*

*41. The apparatus according to claim 40, further comprising means defining a first bore extending through said first stationary support and means defining a second bore extending through said first clamping ring to said interior space of said first bladder, said means defining said conduit extending from said first bore to said second bore.*

*42. The apparatus according to claim 38, further comprising a wear-protection sleeve disposed between said first pressure belt and said first bladder, said sleeve having a first end clamped between said first clamping ring and said second clamping ring.*

* * * * *